United States Patent [19]

Sturges

[11] Patent Number: 4,944,360
[45] Date of Patent: Jul. 31, 1990

[54] PLATFORM ORIENTED TRANSPORTATION VEHICLE

[76] Inventor: Daniel D. Sturges, 4346 Prado Dr., Boulder, Colo. 80303

[21] Appl. No.: 321,831

[22] Filed: Mar. 15, 1989

Related U.S. Application Data

[63] Continuation-in-part of Ser. No. 175,815, Mar. 31, 1988.

[51] Int. Cl.$^5$ .............................................. B62M 1/00
[52] U.S. Cl. ...................................... 180/210; 180/208
[58] Field of Search ............... 180/208, 210, 215, 211; 280/287

[56] References Cited

U.S. PATENT DOCUMENTS

| | | | |
|---|---|---|---|
| 3,004,619 | 10/1961 | Straussler | 180/208 |
| 3,284,130 | 11/1966 | Michael | 280/78.1 |
| 3,388,761 | 6/1968 | Arpin | 180/208 |
| 3,434,558 | 3/1969 | Allen | 180/208 |
| 3,603,609 | 9/1971 | Hott et al. | 280/62 |
| 3,921,740 | 11/1975 | Forster | 188/119 |
| 4,020,914 | 5/1977 | Trautwein | 280/112.1 |
| 4,026,573 | 5/1977 | Richardson | 180/208 |
| 4,065,146 | 12/1977 | Denzer | 280/278 |
| 4,076,091 | 2/1978 | Forster | 180/26 |
| 4,087,108 | 5/1978 | Winchell | 180/208 |
| 4,094,374 | 6/1978 | Adams | 180/208 |
| 4,325,448 | 4/1988 | Pivar | 180/215 |
| 4,336,964 | 6/1982 | Pivar | 180/210 |
| 4,410,198 | 10/1983 | Fernandes et al. | 280/231 |
| 4,412,595 | 11/1983 | Kinzel | 180/211 |
| 4,456,277 | 6/1984 | Carpenter | 280/282 |
| 4,484,648 | 11/1984 | Jephcott | 180/210 |
| 4,506,753 | 3/1985 | Wood, Jr. | 180/210 |
| 4,522,442 | 6/1985 | Takenaka | 296/37.1 |
| 4,538,695 | 9/1985 | Bradt | 180/19.2 |
| 4,573,546 | 3/1986 | Irimajiri et al. | 180/89.1 |
| 4,573,549 | 3/1986 | Pankow | 180/216 |

*Primary Examiner*—Richard A. Bertsch
*Attorney, Agent, or Firm*—Earl C. Hancock; Francis A. Sirr

[57] ABSTRACT

A three wheel vehicle is described having two forward wheels that are driven and steerable. The two forward wheels and the single rear wheel are supported on a single-unit platform member that is molded from an engineering plastic. The vehicle rear wheel is mounted on a trailing arm that is pivoted at generally the middle underside of the platform member. This trailing arm is movable to facilitate three-point vehicle storage, as the vehicle rests on its two front wheels and on its then closely adjacent rear wheel, with the trailing arm in a vertical position. The platform member includes a plurality of pipe-like attachment clip/handles strategically located both within the bounds of the platform and about the periphery of the platform. The vehicle is intended for use by a seated or a standing individual. A plurality of accessories are selectively attachable to the platform member by use of the platform clip/handles. They facilitate use of the vehicle by both a seated and by a standing individual, and protect the individual from the environment. Attachments that facilitate cargo carrying and protection of the individual are described.

23 Claims, 13 Drawing Sheets

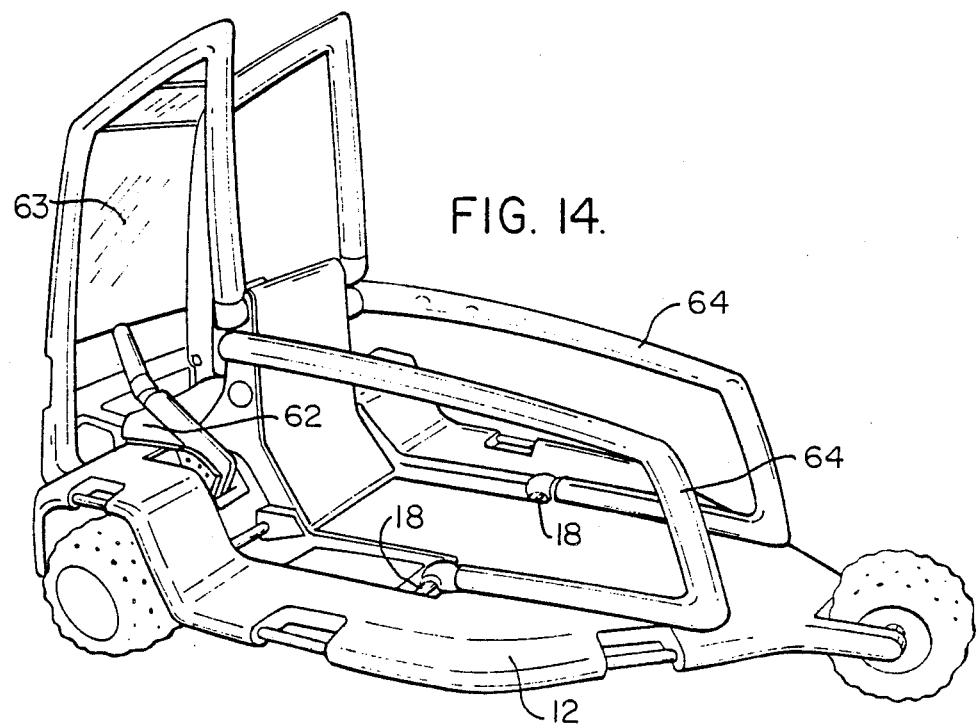
FIG. 14.
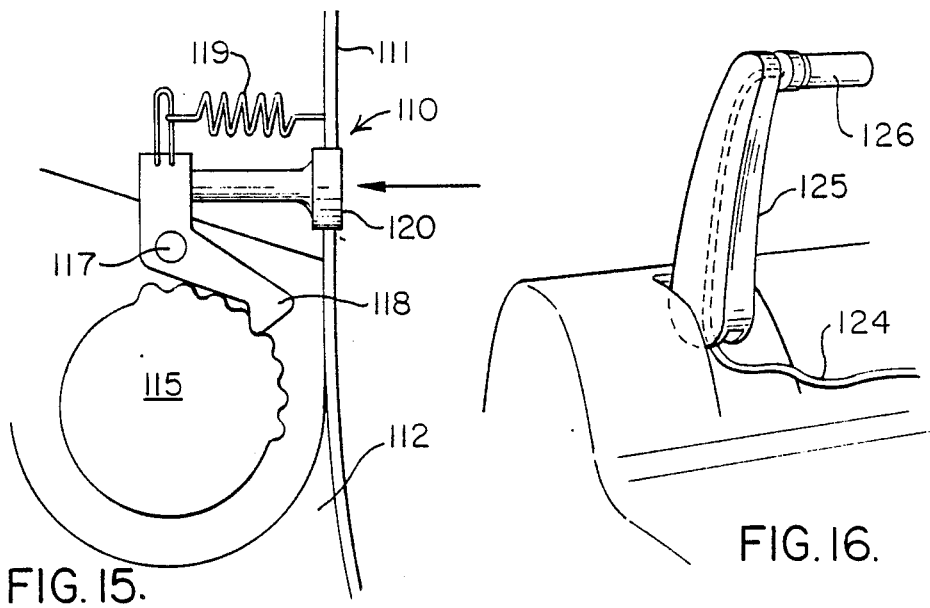
FIG. 15.
FIG. 16.

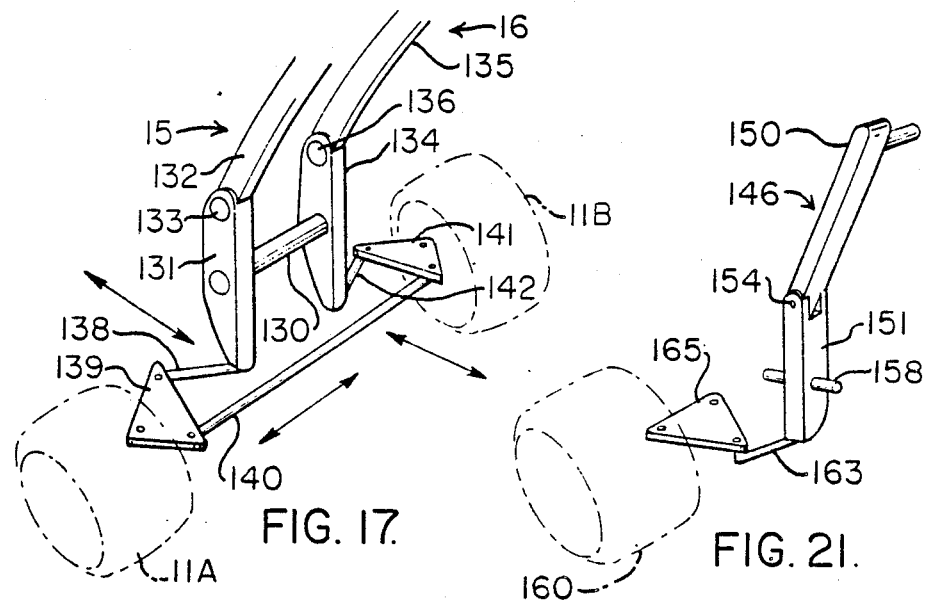
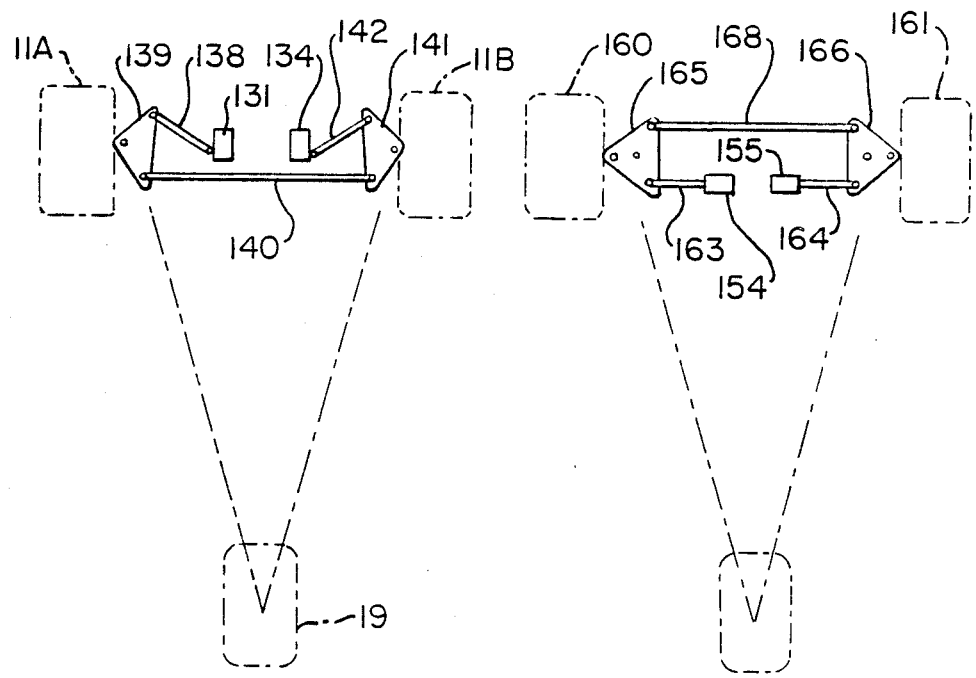
FIG. 17.  FIG. 21.
FIG. 18.  FIG. 20.

PLATFORM ORIENTED TRANSPORTATION VEHICLE

RELATED APPLICATION

This application is a continuation-in-part of copending application Serial Number 07/175,815, filed Mar. 31, 1988 for Platform Oriented Transportation Vehicle.

FIELD OF THE INVENTION

This invention relates to the field of motorized transportation vehicles, and more particularly to land vehicles having two forward wheels and one trailing wheel. The present invention is particularly useful in providing a relatively low cost vehicle for the transportation of passengers and cargo.

BACKGROUND OF THE INVENTION

Many types of small, inexpensive three wheel vehicles are known in the art. Prior practitioners in the art have suggested that such vehicles provide fairings and the like to protect the rider from wind, rain, etc. In addition, such vehicles sometimes include means to facilitate the carrying of cargo, etc.

While these prior art vehicles are generally suitable for their intended purpose, the prior art has failed to provide a vehicle of simple unitized platform construction, the platform having a plurality of attachment means to which a variety of accessories can be attached, to thereby maximize the utility of the vehicle. In addition, unique means for storing or parking vehicles are largely ignored in the prior art.

Of course, two versions of three wheel vehicles exist in the prior art, i.e. those having one front wheel with two rear wheels, and those having two front wheels with one rear wheel.

Of the former class of vehicles, it has been suggested that the vehicle include a detachable fairing to protect the rider. U.S. Pat. Nos. 3,284,130; 4,076,091; and 4,412,595 are examples. In U.S. Pat. No. 4,325,448 the canopy is mounted to the vehicle by way of telescoping tube members. U.S. Pat. No. 4,336,964 discloses a vehicle canopy that is mounted on the vehicle chassis by forcing the generally U-shaped canopy to an open position, placing the thus opened canopy on the chassis, and releasing the canopy, whereupon the canopy restores to its original shape, and mounts into sockets carried by the chassis. Means to enhance the vehicle cargo carrying capacity are described, for example, in U.S. Pat. Nos. 3,921,740 and 4,522,442, the latter showing scooter with a floor shell and removable storage compartment. U.S. Pat. No. 3,603,609 describes such a vehicle that is selectively usable by a seated or by a standing individual. U.S. Pat. Nos. 4,065,146; 4,538,695 and 4,573,549 show vehicles of this type whose steering mechanism is foldable.

Three wheeled bicycle type vehicles are in widespread use. They are relatively inexpensive as the single front wheel is functional with a rudimentary steering mechanism. However, the art has long recognized that three wheel vehicles having two front wheels are inherently more stable than those having but a single front wheel, especially for heavier loads on the vehicle.

Examples of this more stable type of three wheel vehicle that include protective housings for the operator, are U.S. Pat. Nos. 4,484,648 and 4,573,546. In the later of these patents the vehicle motor is mounted between the two front wheels. In U.S. Pat. No. 4,020,914 such a vehicle is made from a two wheel motorcycle, by first removing the motorcycle front wheel and then attaching a two wheel mechanism that includes an operator protection fairing. U.S. Pat. Nos. 4,410,198; 4,456,277 and 4,506,753 show vehicles of this type wherein the rider sits in a recumbent position and wherein fairings and cargo carrying means are provided.

Despite the existence of the various prior art vehicles, a continuing need exists for vehicle that is low cost to manufacture, easily adapted to a wide variety of uses and storable in a minimum of space. Such a vehicle has many uses in the industrialized nations, but is particularly attractive to the so-called emerging or third world nations where widespread acquisition of contemporary automobiles and trucks is economically unacceptable. The present invention fills this need.

DISCLOSURE OF THE INVENTION

The present invention relates to a vehicle which is relatively inexpensive to manufacture and operate, but which is easily adapted for use in a variety of applications and which occupies minimum space when stored or parked. Preferably the vehicle has a minimum of three wheels which are suspended from a platform that is formed as a single unit. In preferred embodiments, a three wheel vehicle is provided, the vehicle having two aligned front wheels and a trailing rear wheel that is disposed in triangular fashion generally between the two front wheels.

The vehicle platform has a plurality of attachment structures for removably attaching elements, such as a canopy, an operator seat and load bearing devices, thereto. These attachment structures are dispersed about the periphery of the platform, and on the upper surface of the platform. A relatively high degree of adaptability of the vehicle is obtained by arranging some of the attaching structures around the platform periphery and/or on the platform upper surface interior of the platform perimeter. A feature that enhances the adaptability of the vehicle is the ability of the attachment structures on the platform to cooperatively engage latches on one or more of the accessories, thereby allowing removable attachment to the platform. In one form, the attachable accessory provides a seat for the operator, in a position manually accessible to a control pedestal.

Control of the vehicle functions is provided by including a control pedestal that extends upward in a generally perpendicular relation to the platform, and in a position that is manually accessible to the vehicle operator. The vehicle is conveniently operated by the operator whether standing or sitting on the platform.

A feature of this invention resides in the form of the control pedestal. The control pedestal includes levers that are linked to the front wheels of the vehicle for providing a steering function. The pedestal levers are arranged for pivoting to a position that places the levers almost flat against the upper surface of the platform. Vehicle function controlling elements such as brakes, throttles, etc., are connectable to these levers to enable the operator to manually control vehicle operation.

The present invention can take the form of a three wheeled vehicle with a unitary horizontal platform member having a front portion forming the front of the vehicle. This front portion is joined by a rearward extending substantially flat support surface for the support of the passengers and/or cargo. The vehicle has the two front wheels and a motive power source connected thereto. The third wheel is supported at the rear of the vehicle, in a triangular relation equidistant from the front wheels.

The front wheels are connected for steering by a manual actuator that extends in a generally vertical upward direction from the support surface. This actuator is foldable to a generally horizontal position adjacent to the support surface, which folded position is especially advantageous for storage.

Vehicle storage is further facilitated by locating the center of gravity for the vehicle when it is empty in proximity to the front wheels. Thus, it is relatively easy to lift the rear of the vehicle when it is empty and when the actuator is folded down. However, the presence of an operator and/or cargo (or passengers) on the horizontal support surface, and with the manual actuator vertically oriented, results in the vehicle center of gravity shifting toward the rear wheel ensuring stable vehicle operation.

The rear wheel is supported on the end of a trailing arm whose forward end is pivoted to the underside of the support surface. When the rear of the vehicle is lifted for parking or storage, this arm pivots to a nearly vertical position, as the vehicle continues to be supported by all three wheels.

An object of the invention is to provide a vehicle having three ground engaging wheels, a generally horizontal load bearing platform, means defining a first horizontal axis of rotation for supporting two of the vehicle wheels on the underside of the platform, an arm pivoted relative the underside of the platform and defining a second horizontal axis of rotation for supporting the third vehicle wheel, the arm having a generally horizontal position wherein the arm extends in a direction generally away from the first horizontal axis of rotation, and means whereby a portion of the platform generally adjacent said third wheel may be lifted vertically, whereupon the arm pivots relative the platform to a generally vertical position, as the platform pivots about the first axis of rotation, and as the three wheels remain in ground engagement, to thereby facilitate three wheel storage of the vehicle with the platform extending generally vertically.

As a feature of the invention, lock means is provided to releasably lock the arm in the generally horizontal position and/or in the generally vertical position.

As a further feature of the invention, a resilient suspension means is provided between the arm and the platform at a position generally adjacent to the rear wheel, and the lock means is constructed and arranged to accommodate the degree of arm motion that is allowed by the suspension means, while the vehicle is in operation.

As yet a further feature of the invention, a plurality of load attachment devices are arranged around the periphery of the platform and on the upper surface of the platform, and accessory means are provided having a plurality of spaced latch means thereon in locations for engagingly cooperating with respective ones of the attaching means.

As a feature of the invention, a control pedestal is provided for the vehicle, the pedestal extending in a generally upward perpendicular direction from the upper surface of the platform, and in a position for manual access by an operator whether the operator is standing or sitting relative to the platform. The pedestal is movable between a first position where it is usable by a standing operator, a second position for use by a sitting operator, and a third position wherein the pedestal extends closely adjacent the upper surface of the platform. The rear wheel supporting arm is pivotally mounted on the under surface of the platform. It order to provide vehicle parking, the arm pivots relative the platform, to a generally vertical position, as the platform concomitantly pivots about the front wheels. In the parked position, the three wheels remain in ground engagement, to thereby facilitate three wheel storage of the vehicle with the platform extending generally vertically.

Those having normal skill in the art will recognize the foregoing and other objects, features, advantages and applications of the present invention from the following more detailed description of the preferred embodiments as illustrated in the accompanying drawings.

BRIEF DESCRIPTION OF THE DRAWINGS

FIG. 14 show an accessory attached to the platform that provides an operator seat, a front fairing to protect the operator, and a rear cargo bay;

FIG. 15 shows means by which the vehicle control handles are collapsed into the FIG. 5 orientation;

FIG. 16 shows a feed cable arrangement internal to a control handle;

FIGS. 17-21 show two exemplary steering linkages for the vehicle's front wheels;

FIGS. 30, 31 and 32 show a folding, removable, operator seat feature of the invention that is usable with the FIG. 25 vehicle, wherein FIG. 30 is a left side view of the front portion of the vehicle showing the seat in an operative position, FIG. 31 is a left side view similar to FIG. 30 showing the seat in a folded position, and FIG. 32 is a perspective view of the seat per se.

DETAILED DESCRIPTION OF THE PREFERRED EMBODIMENTS

The present invention will now be described with reference to preferred embodiments thereof. Features of the invention that maximize the vehicle's utility, including a unique construction and arrangement that facilitates storage and/or parking, while simplifying the details of vehicle construction, are apparent from this description.

Figure 1:
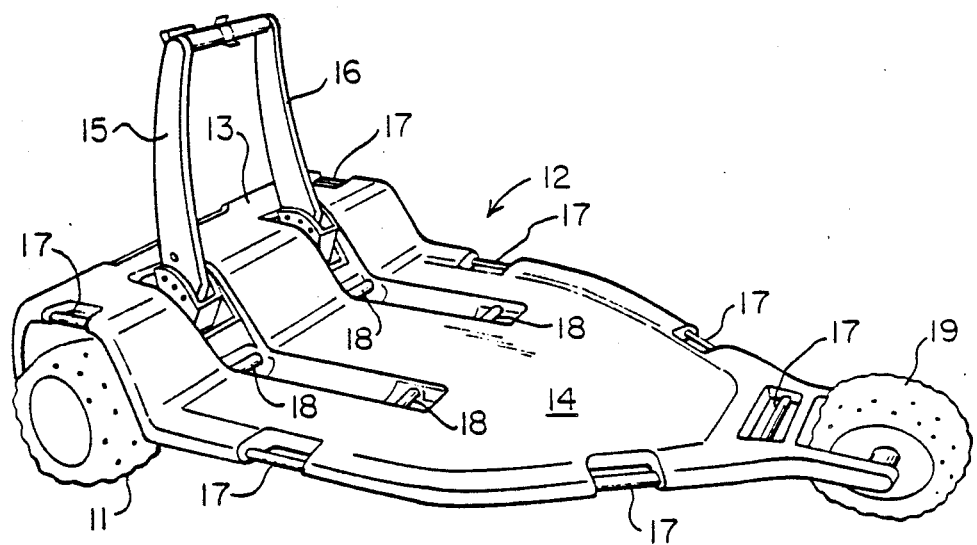
FIG. 1 is a left rear perspective view of a three wheel vehicle embodiment of the present invention.

FIG. 1 is a left rear perspective view showing the basic configuration of the vehicle of this invention. An exemplary size of this vehicle, without limitation thereto, is 4 ½ feet wide and 7 feet long.

As seen from FIG. 1, the vehicle is a three wheeled vehicle having one rear wheel 19, two front wheels 11 (the right front wheel of which is hidden), and a unitary platform member 12 having a front-located raised portion 13 and a generally flat rear portion 14 that is adapted to support the vehicle's human operator and cargo. Portion 14 can also be considered as the vehicle's driving platform.

The above construction and arrangement allows rear wheel 19 support in a flexible manner due to the inherent flexing of platform member 12. Bounce of the rear wheel is controlled by selection of the material from which platform member 12 is formed. For example, rear wheel 19 support may take the form of a living hinge when platform member 12 is constructed of an engineering plastic. Particularly if low speed applications are intended, it is possible to minimize manufacturing cost of the vehicle by incorporating no other independent suspension.

In a preferred construction, but without limitation thereto, three wheels are preferred for the vehicle because this construction offers the simplicity of a two wheel vehicle, while providing about the operator/cargo capacity of a four wheel vehicle.

This vehicle preferably, but again without limitation thereto, provides two front wheels, and the vehicle's major weight components, such as the engine, etc., are located generally between these front wheels. As discussed further below, this construction and arrangement provides a unique means for parking/storing the vehicle in a vertical position, and yet the vehicle is at optimum balance when the operator is aboard and operating the vehicle.

It is known that during the turning of any vehicle, the effective total vehicle weight tends to move forward and produce a force component away from the turn direction. The present three wheel vehicle, having two wheels in front, provides a much safer and stable turn than does a three wheel vehicle having but one wheel in front. Therefore, cornering forces are well managed and controlled by the construction of the invention.

Front portion 13 of platform member 12 forms a downward facing, generally open, horizontal cavity that houses the vehicle motor means, brake means, and steering means, as is later described. The steering means actuator, and the vehicle throttle and brake controls, are provided for convenient operation by the operator by means of two handle members 15 and 16. Handle members 15 and 16 are manually tiltable, generally about the top surface of platform portion 13, toward the front and the rear of the vehicle. Preferably, but without limitation thereto, the brake actuator is associated with handle member 15, and the throttle actuator is associated with handle member 16. By a subsequently described linkage, the vehicle is turned to one side by pulling that side handle back, with or without pushing the other handle forward. Thus, to turn left, left handle 15 is pulled back, as right handle 16 pushed forward.

Two important features of the invention are apparent from FIG. 1. The first of these features comprises a unique construction and arrangement that locates the vehicle's center of gravity close to its front wheels 11. As is explained more fully in relation to FIG. 5, releasing handles 15, 16 from their mounts, and then folding the handles to a generally horizontal position, adjacent floor portion 14, enables the operator easily to lift the rear of the vehicle, causing platform member 12 to pivot about front wheels 11, so that the vehicle is stored or parked by leaning it against a wall or the like. A further unique feature of this construction and arrangement is that when the vehicle is occupied by an operator and/or cargo, the vehicle center of gravity will automatically shift rearwardly onto the area of portion 14, resulting in more stable vehicle operation.

The second unique feature of the invention that is readily apparent from FIG. 1 is that unitary platform member 12 includes a first plurality of fastener means 17, in the form of pipe-like clip/handles, that are located about the periphery of platform member 12, and a second plurality of similar fastener means 18 that are located inboard of platform member 12. These first and second fastening means are adapted for manually handling the vehicle, and as later described, these means also provide for attachment of a large variety of operator/cargo enhancement means. While not specifically shown in FIG. 1, two or more such clip/handles along the generally horizontal front surface of raised portion 13 can further enhance the flexibility of the vehicle. Note FIG. 23 in this regard. Other types of hooks or tie downs can also function satisfactorily.

Platform member 12 is preferably fabricated from an engineering plastic, as by the use of conventional molding techniques, such as blow molding and/or insert molding, as are well known to those of skill in the art. A recyclable material is preferred for platform member 12.

Figure 2:
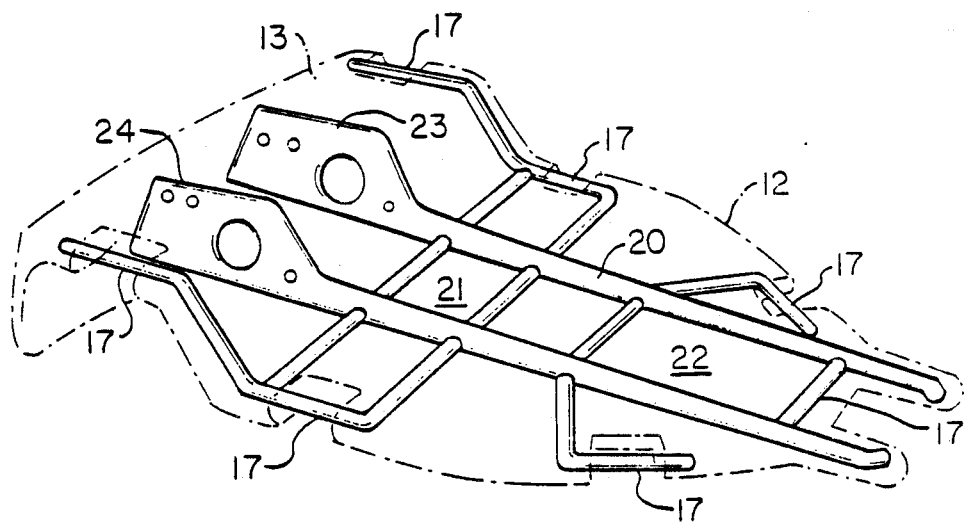
FIG. 2 is a view of unitary vehicle platform of the FIG. 1 vehicle, additionally showing a potential molding insert that may strengthen the platform and provide a plurality of attachment clip/handles within the body of the platform and around the periphery of the platform.

FIG. 2 shows a preferred form of platform member 12 wherein a plastic molded platform 12 includes an internal reinforcing structure in the form of a skeleton-like member 20. Member 20 is preferably made of metal, or perhaps of a reinforced plastic. Member 20 includes generally centrally located sections 21 and 22 that reinforce the area of the platform intended for occupation by the vehicle's operator/cargo. Two forwardly located panel portions 23 and 24 form partitions for the platform's raised portion 13. Panels 23,24 also provide for mounting of the vehicle components that are housed within cavity portion 13, and openings are provided in the panels as are needed to facilitate this function. This figure also shows the unique means by which pipe-like portions of skeleton member 20 remain exposed after molding, to provide the vehicle's unique handle/clip means 17.

Figure 4:
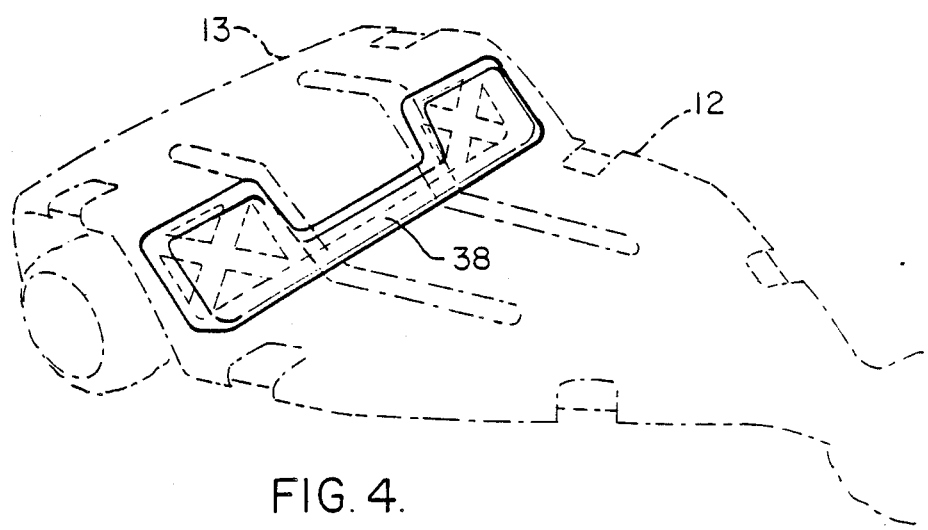
FIG. 4 shows a fuel tank that is molded as part of, or attached to, the platform as a fuel source when the FIG. 3 motor is an internal combustion engine.

With reference to FIG. 4, cavity portion 13 is shown as housing a fuel cell such as a gasoline fuel tank 25 on the under side of platform member 12. In the alternative, and when the vehicle's power source is an electric motor, batteries can be so housed and mounted.

Figure 3:
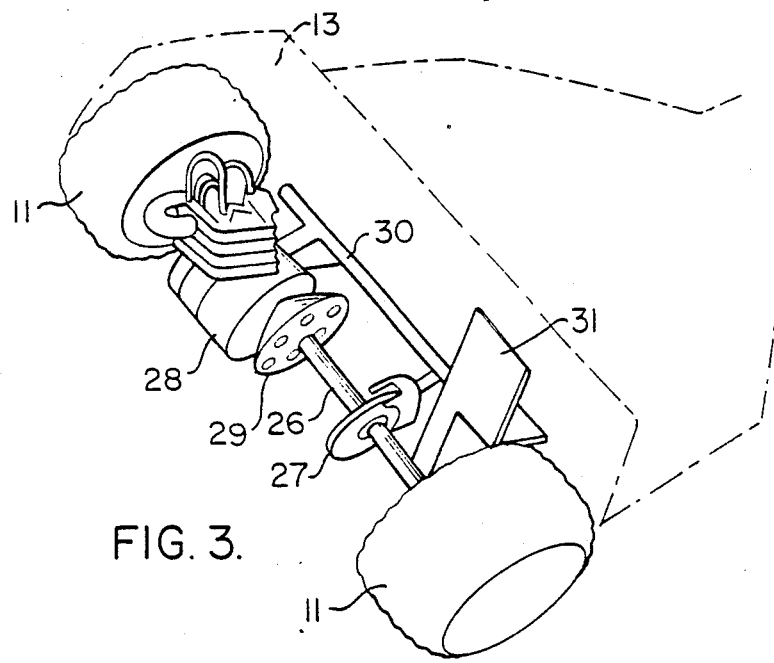
FIG. 3 is partial front view of the vehicle of FIG. 1, where portions of the platform are cut away to expose the motor means that drives the vehicle front wheels, the disk brake means for the front wheels, and the means for mounting these elements to the platform.

FIG. 3 is an exemplary view of the vehicle's two front wheels 11, front axle 26 to which both front wheels are secured, disk brake 27, internal combustion engine 28, and chain, sprocket or belt drive means 29. A support structure 30, including a metal mounting plate 31, provides a means for mounting these devices under the raised cavity portion 13 of unitary platform member 12 and for securing these devices to the platform member. A contemporary 250cc to 500cc, four stroke engine will perform satisfactorily for most applications, and, if desired, it can provide differential action as needed. In some applications, a 125cc to 200cc two stroke engine may perform satisfactorily.

In a preferred embodiment, but without limitation thereto, the vehicle power system might provide but one speed of operation, and a two-stroke motorcycle type gasoline engine, or an electric motor may be used, as is desired. While not shown, it may be desirable to also provide a turn signal function for the vehicle. If dual electric motors are employed to separately drive each front wheel, it is possible to control each wheel by a respective one of handles 15 and 16. Such an arrangement can permit not only control of the vehicle speed, but also its steering without the need of steering linkage mechanisms.

Figure 5:
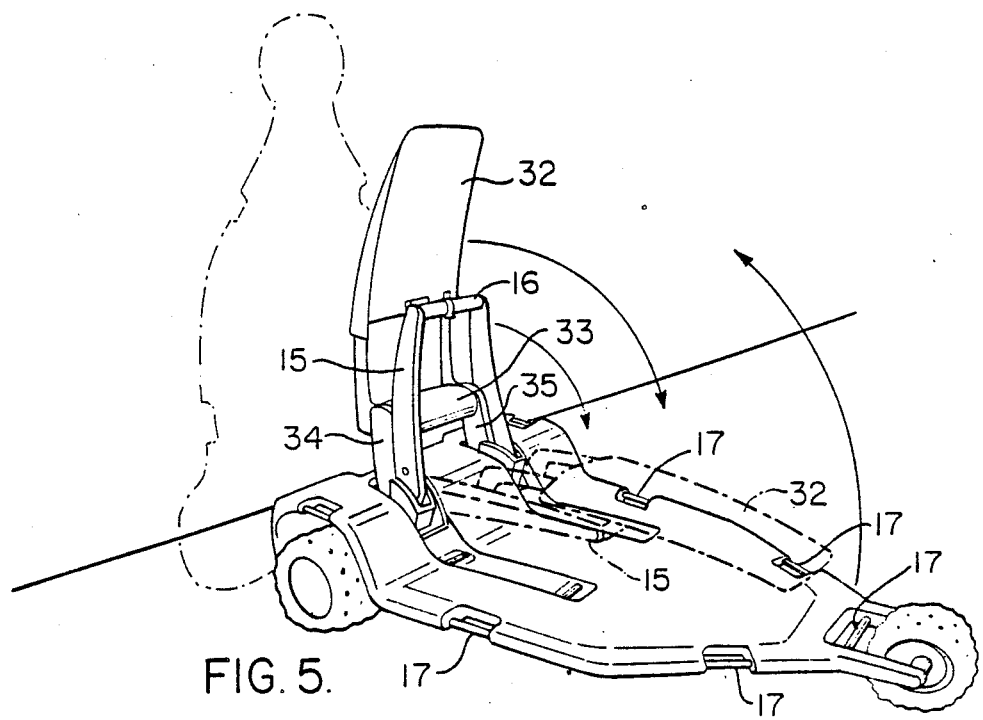
FIG. 5 shows the vehicle of FIG. 1 wherein a front fairing accessory is attached to the platform, and additionally showing both this fairing and the vehicle steering mechanism folded to allow elevation of the rear of the vehicle for purposes of vertical storage.

In FIG. 5, the vehicle is provided with a front fairing that includes a wind screen portion 32 and a headlight 33, both of which are supported by two spaced, vertically extending arms 34 and 35. The lower ends of arms 34,35 are connected to platform 12 by means of a releasable hinge means, not shown. Preferably, headlight 33 is removable for use as a searchlight or a flashlight.

FIG. 5 shows how, when the hinge means that support arms 34,35 are released, and when handle members 15 and 16 are released for folding, these elements are folded or lowered to a horizontal position, generally adjacent to the floor of platform 12, whereupon the light weight rear end of the vehicle can be raised, enabling vehicle storage or parking in a generally vertical position, against a wall or the like, for instance. Incorporation of skid surfaces, small wheels or rollers on the front face of the vehicle can further facilitate positioning of the vehicle after it is in the vertical orientation while inclusion of a kick stand can aid in retaining the vehicle in the vertical position. Note that the vehicle is well suited for towing behind another vehicle, and it is even possible to stow it on the rear of a van or recreational vehicle for use as local transportation after a camping site is reached, for instance.

If a combustible fuel is used and stored in a tank along the lines of FIG. 4, it is obviously important to include some means of shutting off the fuel line. It may prove desirable for safety purposes to employ a mechanism for automatically closing off the fuel line whenever the handles 15 and 16 are pivoted into the horizontal position parallel to the floor of the rear flat surface portion of the platform as shown in FIG. 5.

Note that it is possible to pivot arms 15 and 16 to orientations intermediate of the full vertical and full horizontal positions. This could prove more convenient for the operator especially when operating the vehicle when seated or kneeling. A structure for accommodating multiple positioning of arms 15 and 16 is described later in conjunction with FIG. 15.

A feature of the invention involves the use of the platforms first and second plurality of fastener means 17 and 18 to selectively attach operator/cargo enhancing attachments to the vehicle.

Figure 6:
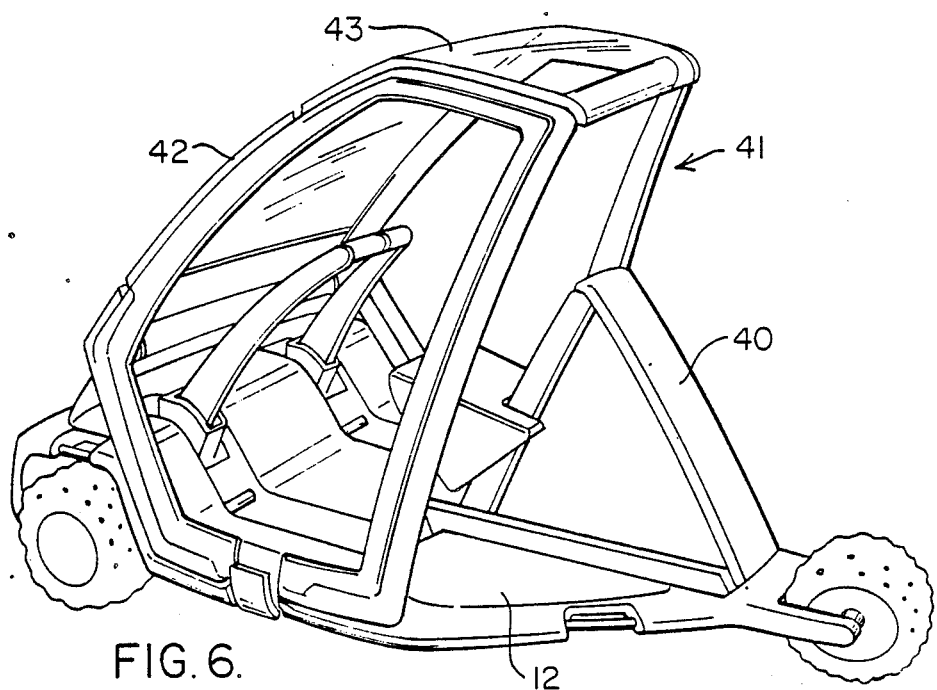
FIG. 6 shows the vehicle of FIG. 1 with a cargo storage seat and a canopy accessory attached to the platform, in a configuration selectively usable by a seated or a standing vehicle operator.

FIG. 6 shows one such attachment. In this case the attachment comprises a plastic molded, hollow seat/cargo compartment member 40 that is attached to platform member 12 by the use of attachment means 18 (see FIG. 1), and a cab-like superstructure 41 that includes a transparent front windscreen 42 and a removable upper canopy 43. The sides and back of this structure may be covered, as desired, by a removable fabric member(s). In this embodiment of attachment means, when canopy 43 is removed, the operator may operate the vehicle while standing on platform 12, or while sitting on member 40. The seat on member 40 is shown vertically adjustable and its base, which can provide a storage compartment, can have a horizontal rail mount to allow forward and backward positioning, if desired.

Figure 7:
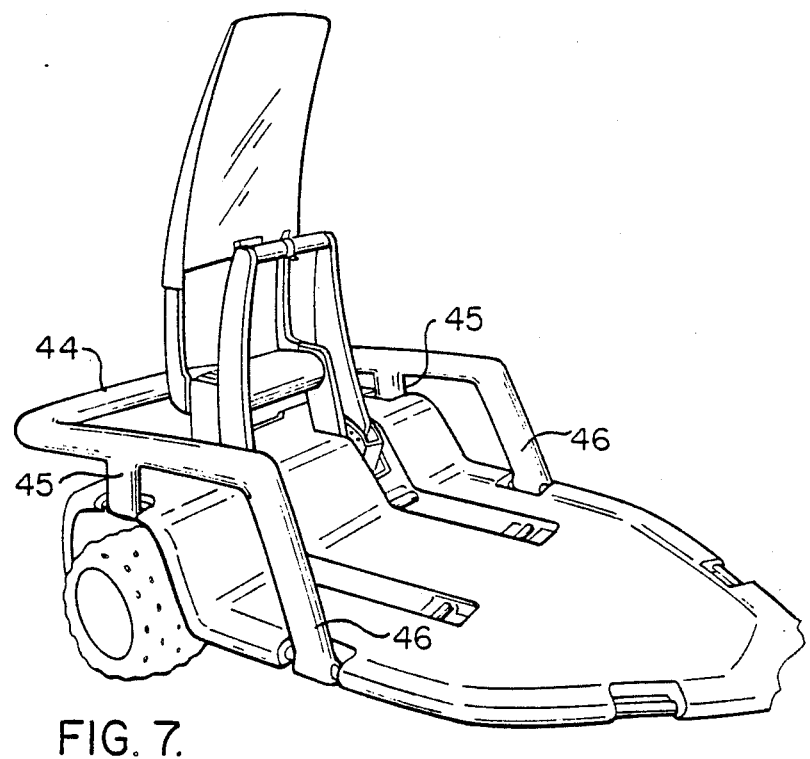
FIGS. 7-10 show the vehicle of FIG. 1 with a variety of different cargo and/or operator protection accessories attached to the platform.

FIGS. 7-10 show embodiments of attachments that primarily function to enhance the vehicle's cargo carrying ability by the use of the platforms fastener means 17. In FIG. 7 the attachment means comprises a rigid, front-disposed, bar-like member 44 having portions 45 and 46 that are attached to the platform's fastener means 17.

Figure 8:
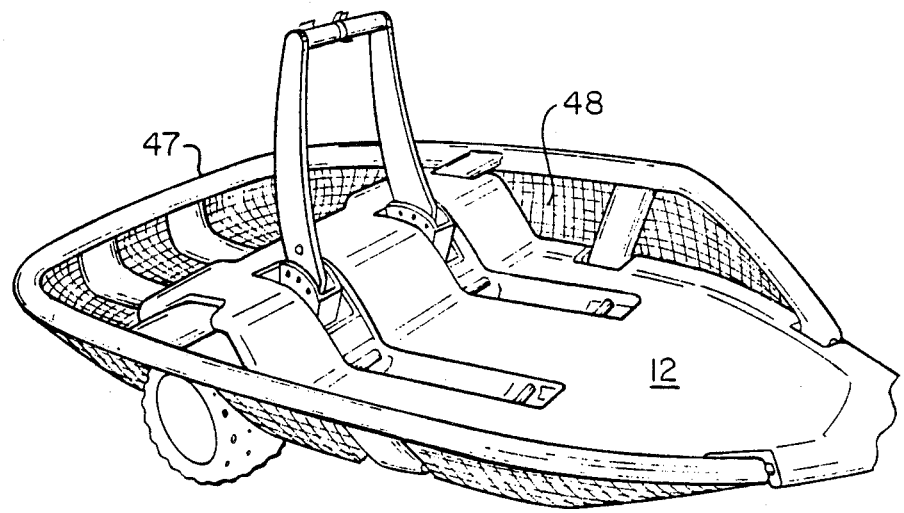
Figure 9:
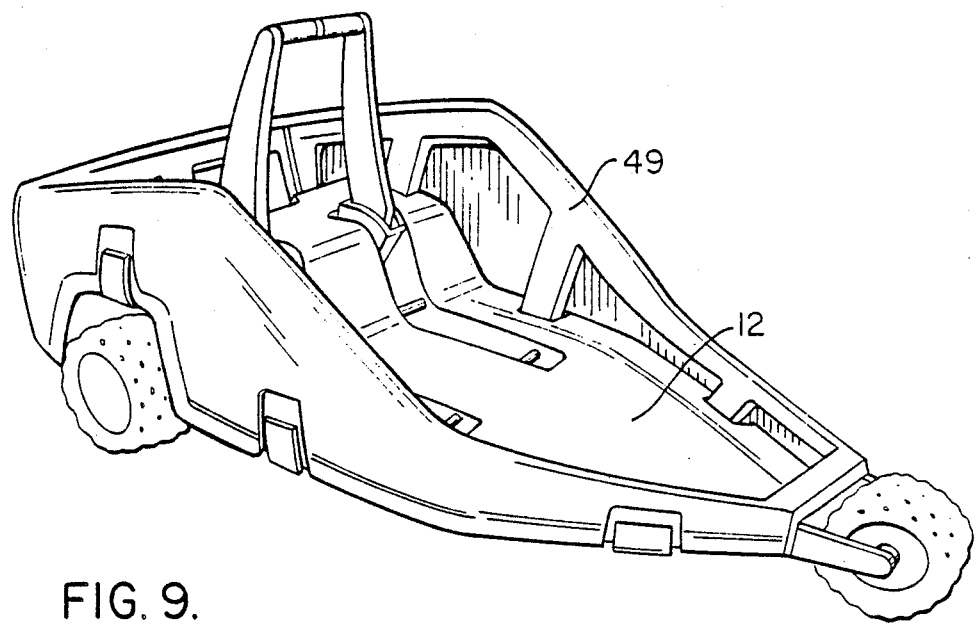

In FIG. 8 the attachment means comprises a rigid, bar-like member 47, also having a plurality of portions that are attached to the platform's fastener means 17. This attachment means effectively expands both the depth and horizontal cargo area of the platform by the use of a cargo net that extends between member 47 and the adjacent periphery of platform 12. FIG. 9 is a somewhat similar attachment means that comprises a solid, plastic molded, wall member 49 whose lower edge is secured, preferably in a water tight fashion, to the periphery of platform member 12.

Figure 10:
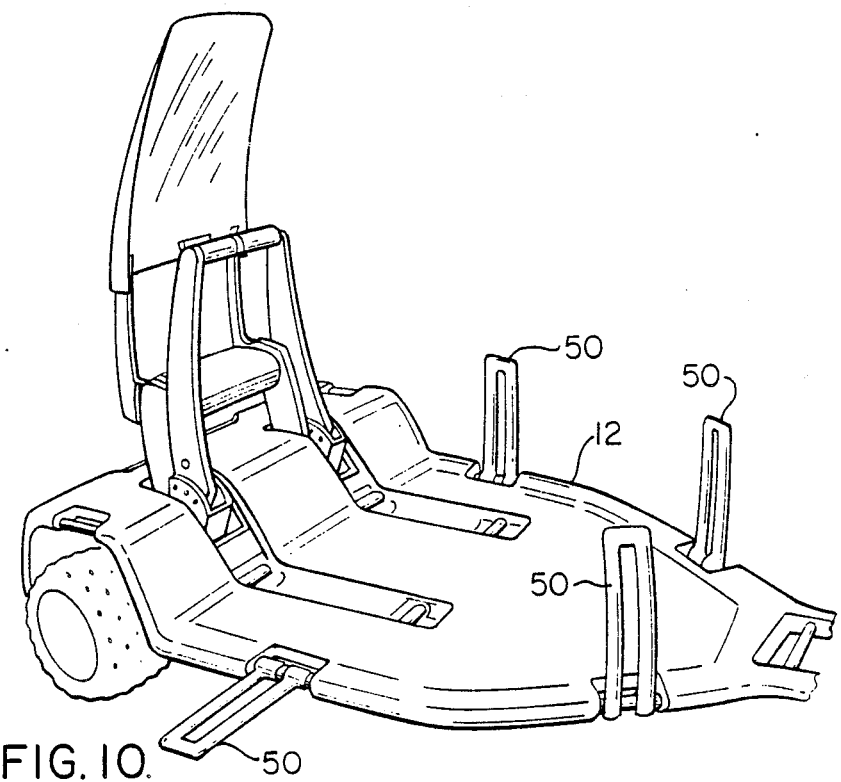

FIG. 10 shows an embodiment of the invention having a plurality of individual elongated arm members 50 that are attached to selected ones of the fastener means 17 of platform member 12. Arm members 50 are constructed and arranged so that they may be secured to platform 12 in a variety of attitudes, such as vertical or horizontal, as shown.

Figure 11:
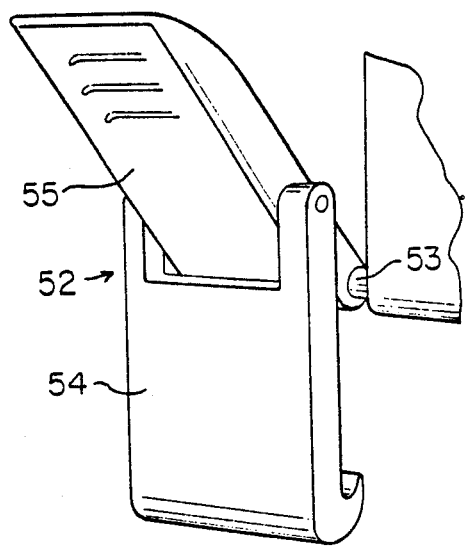
FIGS. 11 and 12 show means for attaching accessories to the handle/clip members carried by the platform.
Figure 12:
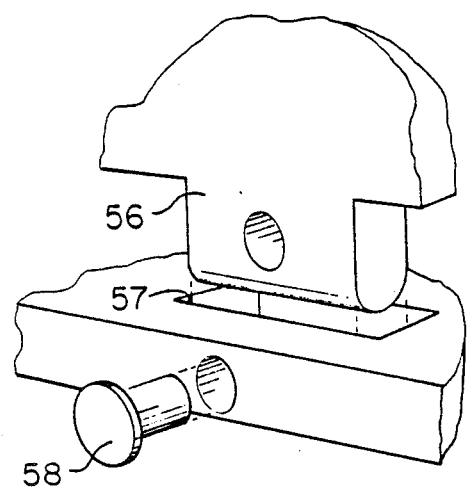

The details of construction of the platform's fastener means 17, 18 is not critical to the invention. Simple snap-on mechanism are sufficient for some applications. If a pipe-like means is provided, as shown, the various attachment means may be secured to the platform by way of an over center clamp, such as is shown in FIG. 11, or with other arrangements of means 17,18 a pin coupler such as shown in FIG. 12 may be used. Of course a great variety of friction fastener means are also available.

Figure 13:
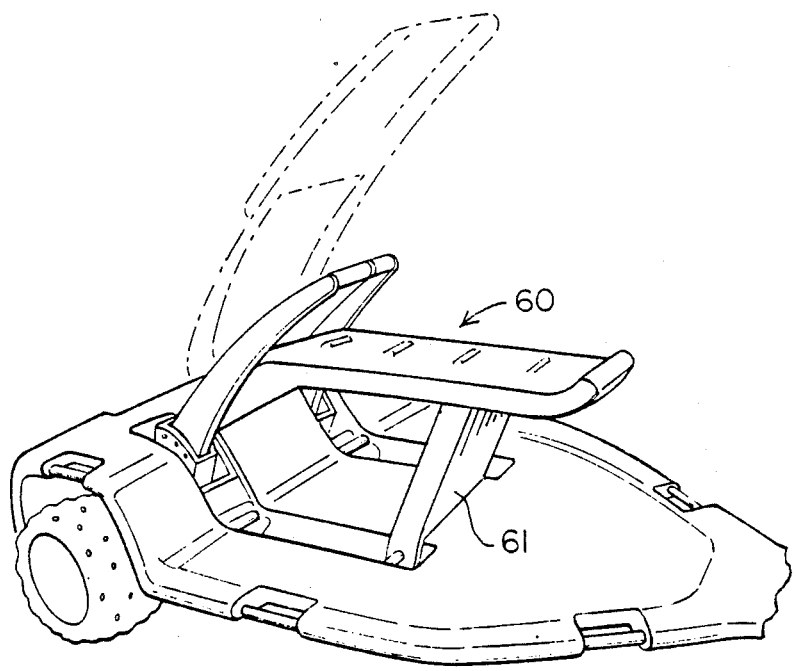
FIG. 13 shows a seat accessory attached to the platform so as to render the vehicle usable by either a standing or a seated individual.

FIGS. 13 and 14 show two further embodiments of the invention. In FIG. 13, a removable seat member 60 is provided. Seat member 60 includes a post portion 61 that is secured to a fastener means 18 of platform 12. The shape of seat member 60 is such that when it is removed from the vehicle platform, it may be inverted and stored on the floor of the vehicle, where its shape conforms to the shape of the floor.

Figure 23:
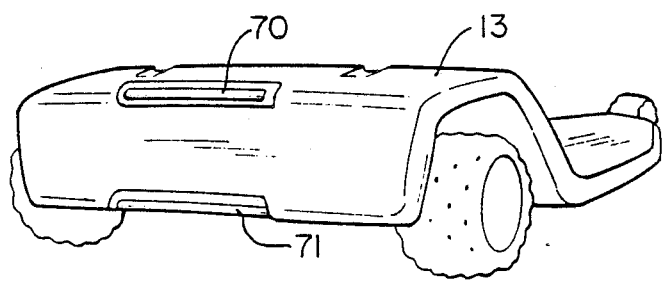
FIG. 23 is a view of a vehicle front with tie down locations included.
Figure 24:
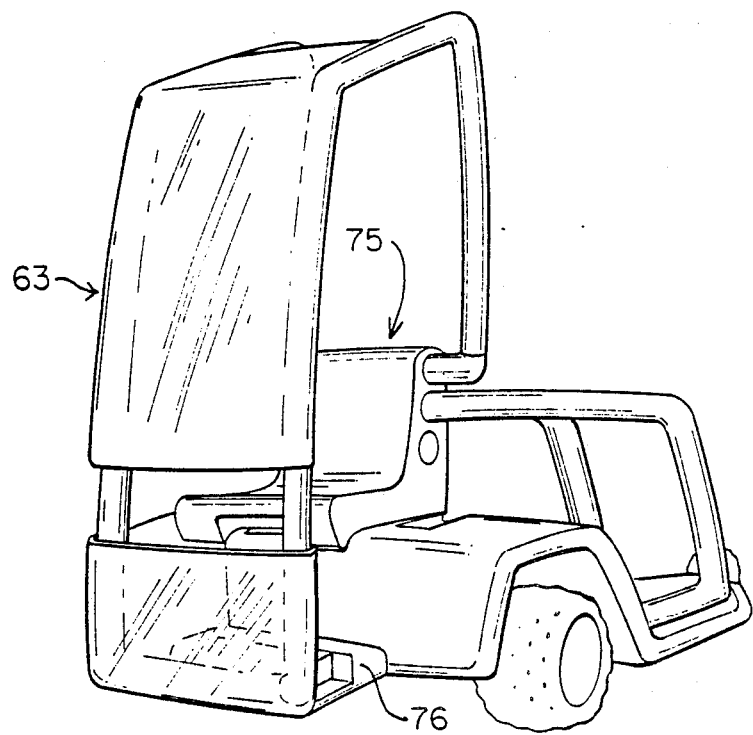
FIG. 24 is an isometric view of a front of a vehicle showing attachment of a seat and protective canopies similar to those shown from the rear in FIG. 14.

In FIG. 14, the attachment means comprises a front located seat portion 62, a windscreen portion 63 and two cargo confining rails 64 whose lower ends are mounted in the fastener means 18 of platform member 12. The attachment of frame 63 in a windscreen position is depicted in FIGS. 23 and 24. Here, raised portion 13 has two elongated tie down bars 70 and 71 embedded therein. As seen in FIG. 24, seat assembly 75 fits over the platform 12 with latches to mate with bars 70 and 71. Assembly 75 includes a forward projecting lower floor 76 onto which the windscreen rails 63 are snapped into place.

FIG. 15 shows a mechanism for selective positioning of the control arm 110. This mechanism allows the operator to pivot the upper segment 111 of control handle 110 relative to the lower segment 112 between a full vertical or upright position, the storage position where upper handle segment 111 is parallel to the platform floor, and any of several intermediate positions as for sitting control or mere operator convenience.

Central bar 115 has an array of ratchet-like teeth 116 which receive the tip of lever arm 118 as it pivots around shaft 117 that is secured within the frame of segment 111. Spring 119 is attached at one end to the frame of member 111 and to the upper end of arm 118 so as to normally bias arm 118 into engagement with one of the notches of teeth 116. The spring bias and the configuration of the tip of arm 118 and its mating tooth 116 is such that segments 111 and 112 remain in a fixed position relative to one another despite pivoting of handle 110 for steering the vehicle.

Plunger 120 is mounted in the frame of segment 111 to accommodate sliding movement towards arm 118 to which it is attached. Thus, when the operator desires to reposition handle 110, the upper part of segment 111 (not shown in FIG. 15) is manually gripped while plunger 120 is depressed. Typically this is accomplished either by hand or by foot although any of a variety of means can provide this result such as by inclusion of a release mechanism linked to a convenient location in proximity to the manual grip. After actuation of plunger 120, upper segment 111 is pivoted to the intended position and plunger 120 is released. Arm 118 once again securely engages a tooth of array 116.

The segments forming the handles for the control pedestal are preferably hollow or of open channel construction to accommodate control cable connections into an accessible location for the operator. This is generally illustrated in FIG. 16 where cable bundle 124 is shown passing through the interior of handle 125 into proximity to handle grip 126. The vehicle function controls thereby placed at the operator's fingertips and the manner of implementing them are conventional. Such functions can include brakes, throttle, light switches, a release lever for the above described handle pivot mechanism, etc.

A steering control useful for the FIG. 1 vehicle along with the other previously described embodiments is illustrated in FIGS. 17 and 18. Both wheels 11A and 11B are visible in FIG. 17 in their operative relationship to handle assemblies 15 and 16. Shaft 130 is fixed to the platform (not shown in FIGS. 17 and 18) with lower segment members 131 and 134 free to rotate around shaft 130. Upper segments 132 and 135 are joined to lower segments 131 and 134, respectively, at pivot pins 133 and 136. As mentioned before herein (i.e.: FIG. 15), segments 132 and 135 are selectively releasable to rotate around pins 133 and 136 to different positions. In normal use, arms 15 and 16 independently rotate about shaft 130.

The lower tip of handle 15 is pivotally connected to rod 138 and thence to plate 139. Plate 139 is attached to wheel 11A so that the wheel is turned in response to arm 15 rotation either towards the operator (i.e.: the operator pulling on arm 15) or away from the operator (i.e.: the operator pushing on arm 15). In forward vehicle motion, the former causes a turn to the left whereas the latter causes a turn to the right. Handle 15 is further coupled to handle 16 by a linkage composed of tie rod 140, pivot plate 141 and connecting rod 142 with plate 141 attached to turn right wheel 11B similarly to wheel 11A.

Figure 19:
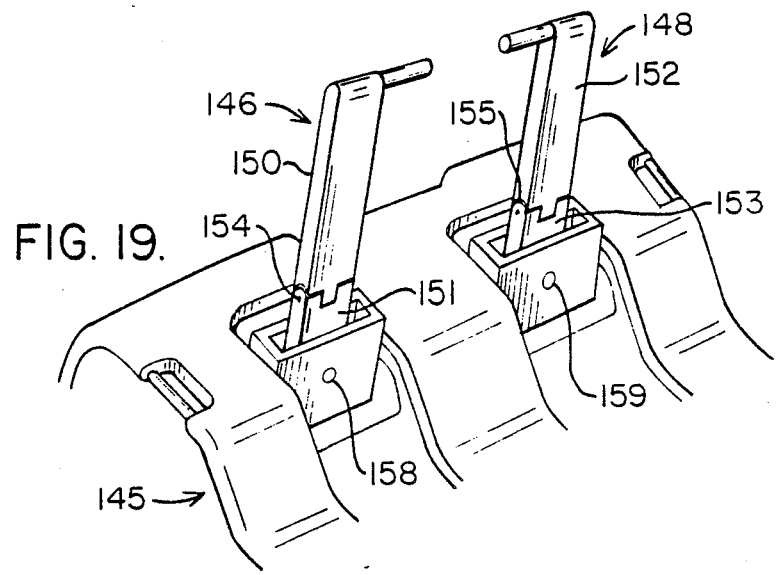

In operation, the vehicle driver can effect a left turn by either pulling on handle 15, pushing on handle 16, or both. While this is somewhat different from conventional T-handle steering, the net result of body motion is substantially the same. Thus minimal operator education is needed for an individual to learn to use the vehicle. However, a modification of the steering handles so they are pivotable in the direction of an intended turn is shown in FIGS. 19, 20 and 21. In this configuration, very little is needed to develop a working familiarization with the controls since the operator standing or sitting on vehicle 145 pivots handles 146 and/or 148 to the left for a left turn and to the right for a right turn.

Handles 146 and 148 are constructed with upper and lower segment sets 150/151 and 152/153, respectively. These segments are joined by hinges 154 and 155 to allow pivoting for more convenient access to a seated operator and/or for storage along the lines previously described. Shafts 158 and 159 attach arms 146 and 148 to the platform, but in a manner that allows rotation in directions transverse to the direction of normal vehicle movement.

FIGS. 20 and 21 illustrate the linkage of handles 146 and 148 to the steerable wheels 160 and 161. This linkage is somewhat of a mirror of the FIGS. 17 and 18 linkage. It includes connecting rods 163 and 164 coupling lower segments 154 and 155 to plates 165 and 166 which are interconnected by tie rod 168. Pivot plates 165 and 166 are attached to wheels 160 and 161 so that they are turned in response to rotation of those plates. Accordingly, pivoting of handles 150 and 151 to the left (FIG. 19) causes the lower segments 151 and 153 to rotate around pins 158 (FIG. 21) and 159. The result is the bottom tips of segments 151 and 153 move towards the right so that the linkage turns both wheels 160 and 161 to the left.

While the dual, inverted "L" shaped control handle approach is followed in the example shown in FIGS. 19–21, note that a single column with handles on either side at the top in a T-shaped profile with the bottom of the column connected to both rod 162 and 164 can provide the same result.

Figure 22:
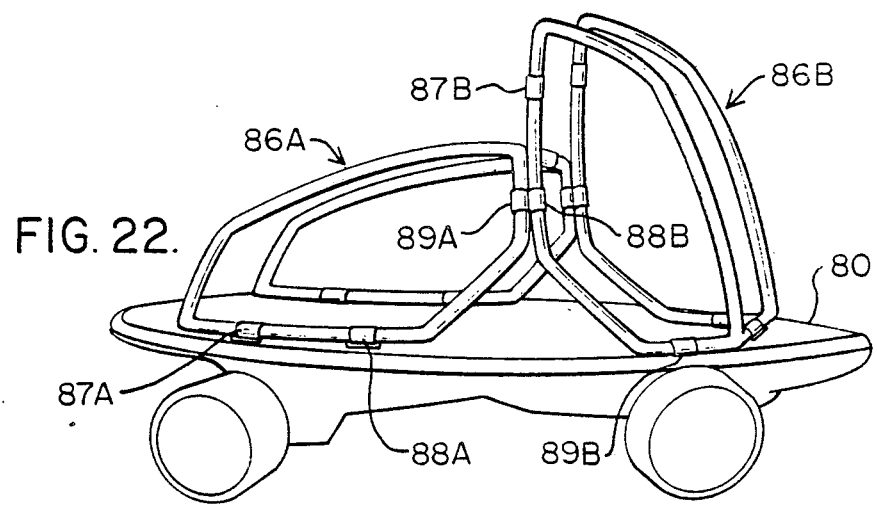
FIG. 22 shows another platform arrangement along with a commonly configured canopy suitable for multiple purpòses.

Yet another version of common canopy structure is shown in FIG. 22. Here the platform 80 is essentially flat and thus somewhat higher than in the previously mentioned embodiments. Canopies 86A and 86B are identical in structure and include fasteners 87A–89A and 87B–89B. Thus, two configurations of essentially the same canopy establish protection for the operator via windscreen 86B and cargo protection in the form of cover 86A.

FIGS. 25–32 show further embodiments of the invention. A feature of these embodiments relates to the use of a trailing arm for rear vehicle wheel suspension, this trailing arm also functioning as a parking stand. In this way, the lifting weight of the vehicle is reduced, and the rear of the vehicle can be easily lifted to provide vehicle parking/storage. Once the vehicle of this embodiment is parked, only a small mass of the vehicle is located at an elevated position. Thus, the likelihood of the vehicle tipping due to an accidental sideways force is reduced.

For purposes of simplicity, the plurality of load attachment devices that are arranged around the periphery and on the upper surface of the vehicle platform, and various accessory means having latch means for engagingly cooperating with respective ones of these attaching means, all as above described, are not shown in FIGS. 25–32. However, it is to be understood that all such means are intended for use with the vehicle of FIGS. 25–32.

In FIGS. 25–31, certain reference numerals are again used to identify items that are identical, or substantially identical, to items contained in the foregoing description.

The vehicle of this embodiment is preferably, but again without limitation thereto, provided with two front wheels 11 that rotate about a common axis of rotation. The major weight components of the vehicle, such as the engine, etc., are located generally between, or adjacent to, the axis of rotation of front wheels 11. As was previously discussed, this unique construction and arrangement facilitates a unique means for storing or parking the vehicle in the vertical position of FIG. 26, and yet the vehicle is at optimum balance when the operator is aboard and operating the vehicle when the vehicle is in its FIG. 25 position.

In this embodiment of the invention the front portion of the vehicle platform (i.e. the left hand portion of FIG. 25) houses the vehicle motor means, brake means, and steering means, as was previously described. The steering means actuator, and the vehicle throttle and brake controls, are provided for convenient operation by the operator by means of two handle members 15 and 16 that comprise a control pedestal. Handle members 15 and 16 are manually tiltable, generally about the top surface of the front platform portion, toward the rear of the vehicle. The vehicle is turned to one side by pulling that side handle back, while pushing the other handle forward. Thus, to turn left, the left handle is pulled back, as the right handle is pushed forward.

Figure 26:
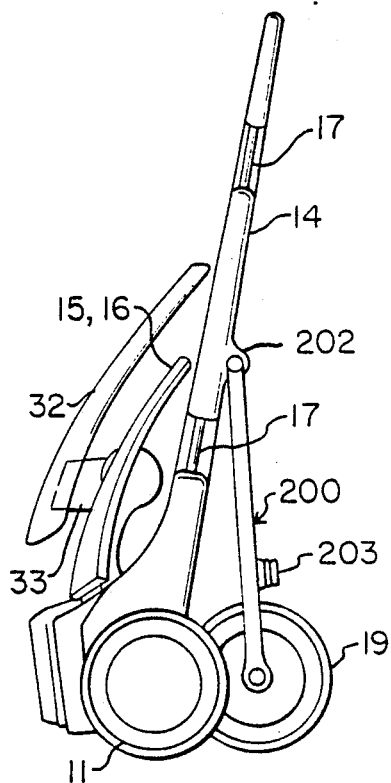
FIG. 26 is a right side view of the vehicle of FIG. 25 in the stored/parked position.

As was previously described, the pedestal that includes handles 15,16 is selectively movable to one of three positions, so as to be usable by a standing operator, by a seated operator, or the pedestal can be lowered as is shown in FIG. 26 to facilitate vertical storage and/or parking of the vehicle.

Figure 25:
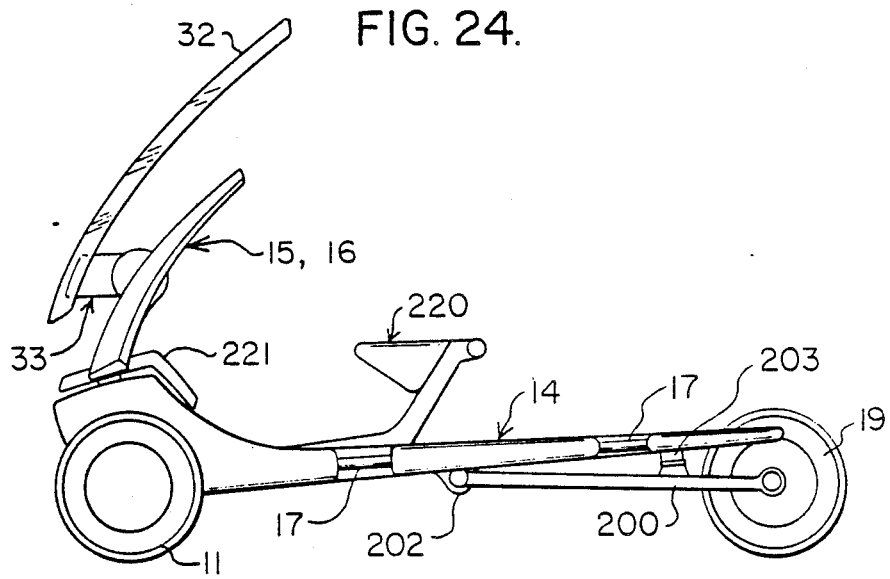
FIG. 25 is a right side view of an embodiment of the invention having two front wheels and a single rear wheel with the rear wheel mounted on an arm pivotally attached to a generally middle portion of the vehicle platform.

As is apparent from FIG. 25, since the vehicle center of gravity is close to front wheels 11, the folding of handles 15,16 to a generally horizontal position, adjacent floor portion 14, enables the operator to easily lift the rear of the vehicle, causing the platform member to pivot about front wheels 11, so that the vehicle may be stored or parked. In this embodiment of the invention, due to a pivoting arm rear wheel suspension construction and arrangement, the vehicle need not be stored or parked against a supporting object, such as a wall or the like.

Figure 30:
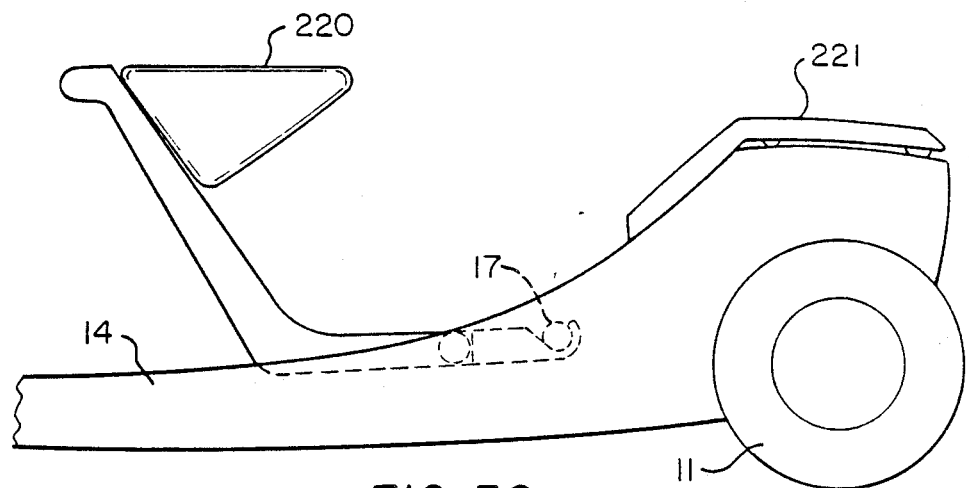
Figure 31:
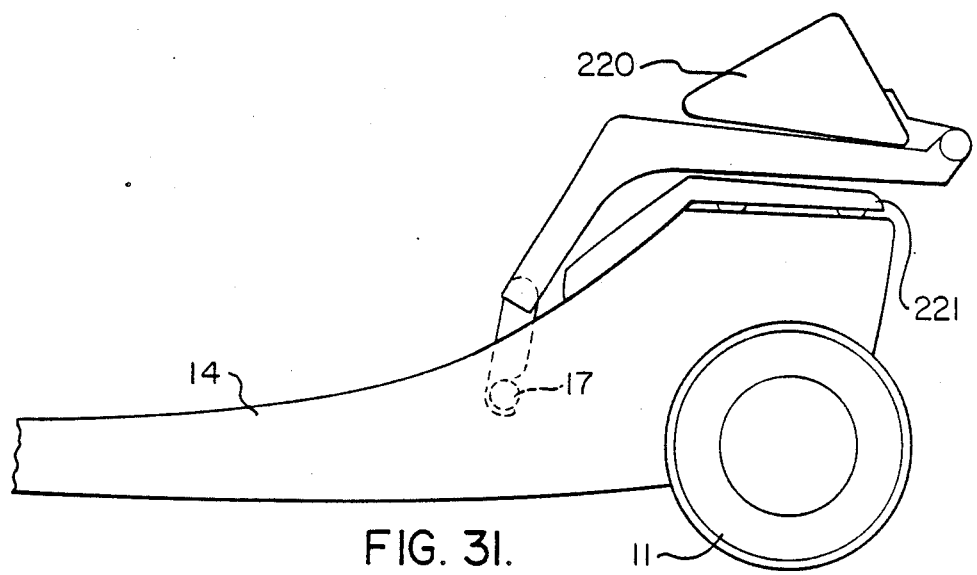
Figure 32:
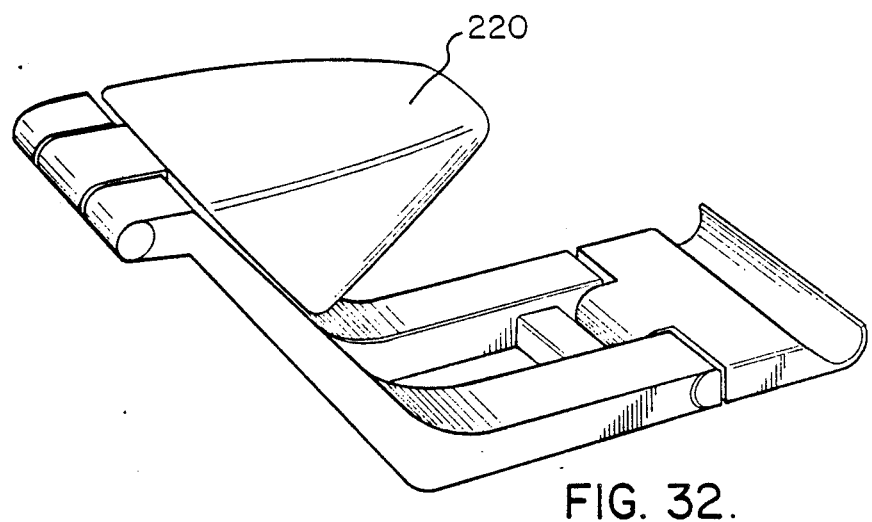

Pipe-like clip/handles 17 are located about the periphery of vehicle platform, as well as within the upper surface of the platform, to provide a means for attachment of a large variety of operator/cargo enhancement means, as above described, including the folding seat arrangement shown in FIGS. 30–32. Two of the attachment means 17 are shown on each side of the vehicle platform. These means 17 also may function as handles by which the vehicle platform is easily manually moved between the FIG. 25 position and the FIG. 26 position, as the platform pivots about the common axis of rotation of front wheels 11.

The vehicle platform of this embodiment is preferably fabricated from an engineering plastic, as by the use of conventional molding techniques, such as blow molding and/or insert molding. A recyclable material is preferred for the platform.

The vehicle of this embodiment is provided with a front fairing that includes a wind screen portion 32 and a headlight 33, both of which are supported and connected to the vehicle platform by means of a releasable hinge means, not shown. In this way, means 32 and 33 can be folded for storage and/or parking as is shown in FIG. 26. For purposes of simplicity the means 32 and 33 are not shown in FIGS. 30 and 31.

As previously mentioned, the construction and arrangement of this embodiment of the invention does not require that the vehicle be stored or parked against a supporting object such as a wall. This advantage is achieved by the use of a pivoted arm 200 whose trailing end supports rear wheel 19 on an axis of rotation that is generally parallel to the axis of rotation of front wheels 11.

Figure 27:
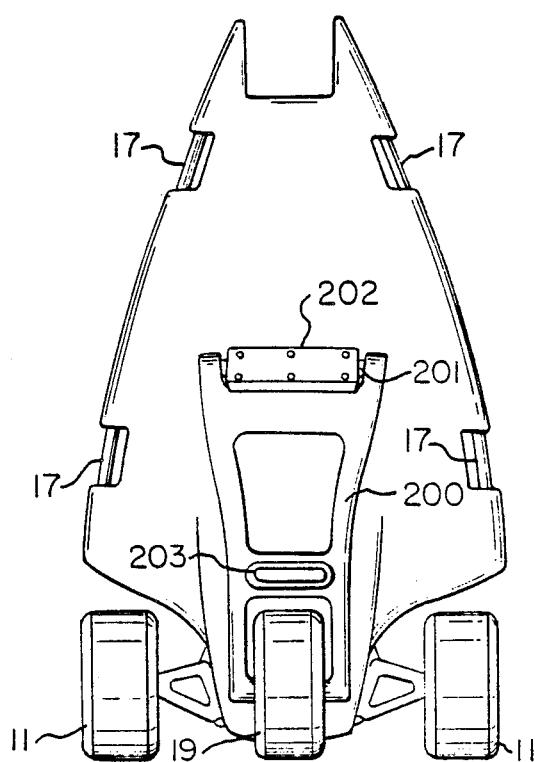
FIG. 27 is a bottom view of the stored/parked vehicle of FIG. 26.
Figure 28:
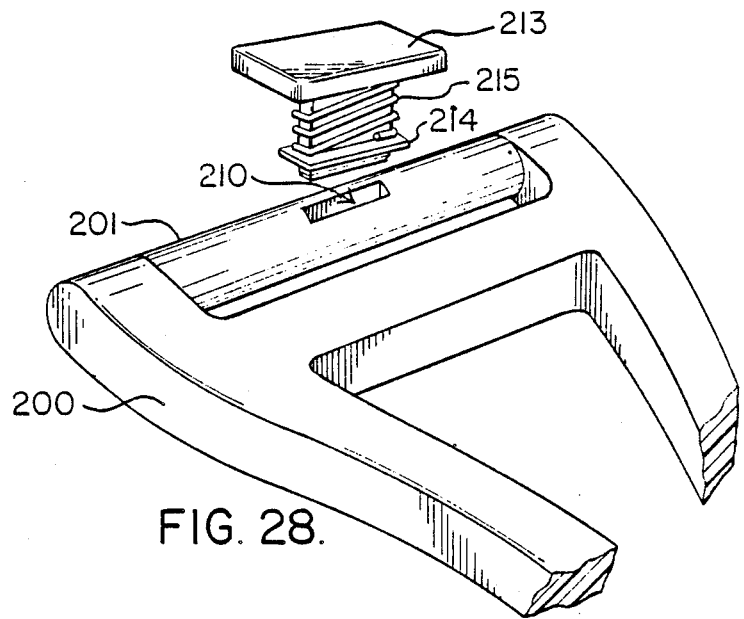
FIGS. 28 and 29 are views of a manually operable locking means that is associated with the wheel supporting arm of FIGS. 25-27, showing how the arm is selectively locked in the generally horizontal position of FIG. 25 and in the generally vertical position of FIGS. 26 and 27.

As is best seen in FIGS. 27 and 28, the front or leading end of arm 200 includes an integral pivot pin 201 whose axis extends generally parallel to the axes of rotation of the vehicle wheels. Pin 201 is rotatably mounted in a socket 202 that is formed on the underside of the flat rear portion 14 of the vehicle platform. Preferably, but without limitation thereto, arm 200 carries a shock absorbing means 203 at a location thereon that is adjacent rear wheel 19. An exemplary shock absorbing means comprises an elastomeric member that is attached to arm 200, and engages the underside of platform portion 14 when arm 200 is in its horizontal operating position, see FIG. 25.

In order to store or park the vehicle, the operator vertically lifts the rear platform portion 14, causing the platform to rotate about the axis of rotation of the vehicle's front wheels 11. As the platform is lifted, arm 200 swings downward relative the platform, as rear wheel 19 remains in contact with the ground. As the platform is raised to the near vertical position shown in FIG. 26, a point of stability is reached where the vehicle is stable in the generally vertical position. The vehicle is now in its stored/parked position. In this position the vehicle is supported by its three wheels, and storage/parking is achieved without the need for a wall or the like against which to rest the vehicle.

A feature of the invention that is apparent in FIG. 27 is that the bottom of the vehicle platform is a smooth, sealed surface with the motor mounted on top of the platform or in a bay or well extending downwardly from the top front of the platform with cover 221 providing protection. With this construction and arrangement, the vehicle easily skims over mud, water, snow, and the like.

As a further feature of the invention, a locking means is provided whereby arm 200 can be selectively locked in the horizontal operating position of FIG. 25 or in the vertical storage/parked position of FIGS. 26 and 27.

Figure 29:
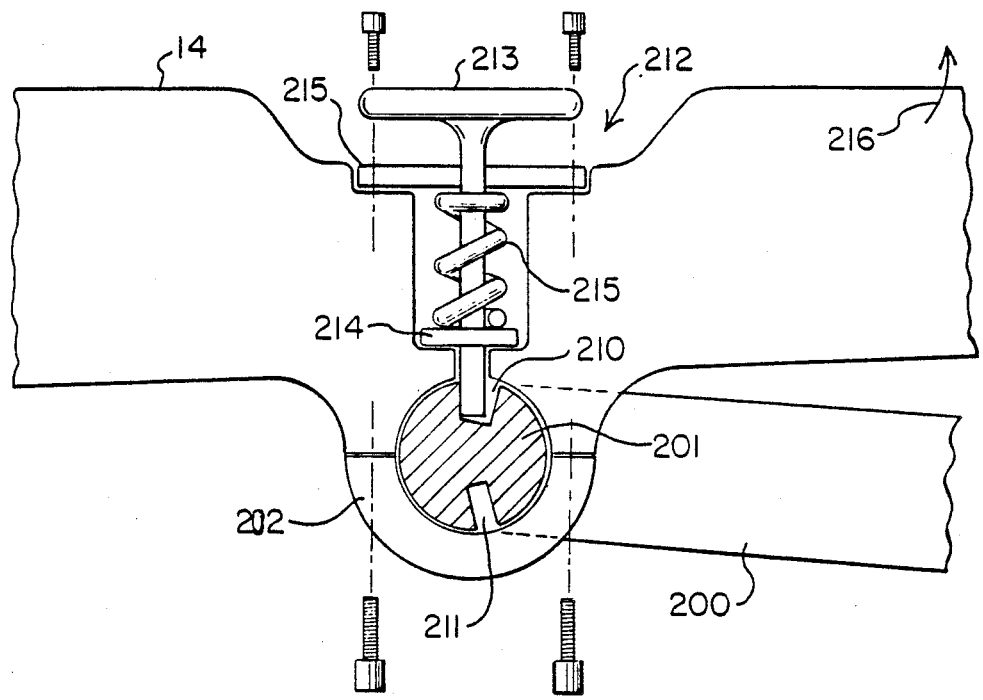

With reference to FIGS. 28 and 29, it can be seen that pivot pin 201 includes a pair of locking slots 210 and 211. Slot 210 is operative to lock arm 200 in its horizontal operation position, and slot 211 is operative to lock arm 200 in its vertical parking position.

The top surface of platform portion 14 includes a recess 212 in which a manually operable lock handle 213 is housed, with the top of the handle being substantially flush with the upper surface of platform portion 14. Lock handle 213 mounts a locking tab 214 on its lower end. A flat coil spring 215 is placed in compression by virtue of a lock cover plate 215 that is attached to the platform so as to trap spring 214 against the top surface of tab 214.

As is best seen in FIG. 29, the vehicle may be moved to the FIG. 26 vertical position by lifting lock handle 213 with one hand, as the other hand raises the rear of the vehicle platform (see arrow 216 of FIG. 29), for example by using one of the pipe-like means 17. In so doing, tab 214 is lifted out of slot 210, and as the platform elevates, arm 200 rotates CW as viewed in FIG. 29. Handle 213 is now released, and lifting of the vehicle platform continues. When arm 200 has been rotated to the FIG. 26 position, tab 214 seats itself in slot 211, under the force of spring 215. Later, when the operator wants to return the vehicle to its horizontal operation position, handle 213 is again momentarily lifted, as the vehicle platform is lowered, i.e. rotated CW from its FIG. 26 position to its FIG. 25 position. Again, tab 214 seats in slot 210 when arm 200 returns to its horizontal operation position.

As a feature of the invention slot 210 is provided with lost motion in the form of a circumferential width (see FIG. 29) that allows arm 200 to pivot a small amount, under control of suspension means 203. In this way, arm 200 is locked in its operation position, and yet a certain amount of arm movement is allowed as suspension means 203 expands and contracts in operation.

While a preferred form of a locking means for arm 200 has been shown and described with reference to FIGS. 28 and 29, it is recognized that those skilled in the art will readily visualize other forms of locking means. Thus the spirit and scope of the invention is not to be limited by the above description. As an example of another form of locking means that is within the invention, a pin and slot locking arrangement that includes an operating handle located at the rear of the vehicle, in a position to be operated concomitantly with lifting of the vehicle, may be provided.

FIGS. 30-32 show attachment means in the form of a foldable seat 220 that is usable with the embodiments of the invention. In FIGS. 30 and 31 the control pedestal, etc., are not shown for purposes of simplicity. Folding seat 220 can be used, for example, in a situation where the operator sits on seat 220 as an empty vehicle is taken to a site where a load is to be picked up for later transport on the vehicle platform (see FIG. 30). Prior to loading the platform, seat 220 is folded to the front of the vehicle, out of the way, and over engine cover 221 (see FIG. 31). The entire platform is now available for carrying the load. After the vehicle is loaded, the vehicle is operated by the operator while in a standing position.

As will be appreciated by those of skill in the art, the scope and content of this embodiment of the invention is also present in alternate structures, for example, where the rear wheel may comprise two wheels, rather that one wheel as is shown, where the trailing arm means 200 may comprise more than one arm as is shown, and/or where alternative arm locking means may be provided. These and other alternative arrangements are to be considered as being within the scope and content of the invention.

While the exemplary preferred embodiments of the present invention are described herein with particularity, those having normal skill in the art will recognize various changes, modifications, additions and applications other than those specifically mentioned herein without departing from the spirit of this invention.

What is claimed is:

1. A vehicle having front and rear ground engaging wheel means, comprising:

a unitary and generally horizontal load bearing platform having spaced front and rear platform portions, means defining a first horizontal axis of rotation for supporting said front wheel means on the underside of said platform adjacent to said front platform portion, whereby said front wheel means operates to support said front platform portion above the ground, an arm having a first end portion pivoted relative to the underside of said platform adjacent to said front platform portion, and having a second end portion spaced from said first end portion and defining a second horizontal axis of rotation for supporting said rear wheel means relative to the underside of said platform adjacent to said rear platform portion, said arm having a generally horizontal position wherein said arm extends in a direction generally away from said first horizontal axis of rotation, releasable platform suspension means extending between the second end portion of said arm and said rear platform portion without physically attaching the second end portion of said arm to said rear platform portion, whereby said rear wheel means operates to support said rear platform portion above the ground, and means whereby said rear platform portion may be lifted vertically upward, whereupon the second end portion of said arm and said rear platform portion pivot away from each other, as said platform pivots about said first axis of rotation, as said arm pivots about the first end thereof, and as said rear wheel means remains in ground engagement, to thereby facilitate storage of said vehicle with said rear platform portion extending generally vertically upward, and with the second end portion of said arm extending generally vertically downward.

2. A vehicle in accordance with claim 1 wherein said first and second axes of rotation are parallel, and wherein said arm extends in a direction generally perpendicular to said first axis of rotation.

3. A vehicle in accordance with claim 1 including lock means to releasably lock said arm in said generally horizontal position.

4. A vehicle in accordance with claim 1 including lock means to releasably lock, said arm in said generally downward position.

5. A vehicle in accordance with claim 1 including resilient suspension means extending between said arm and the underside of said platform at a position generally adjacent said second axis of rotation.

6. A vehicle in accordance with claim 1 including a plurality of load attachment devices arranged around the periphery of said platform and on the upper surface of said platform interiorly of the perimeter of said platform.

7. A vehicle in accordance with claim 1 wherein said first and second axes of rotation are parallel, and wherein said arm extends in a direction generally perpendicular to said first axis of rotation, and including,
lock means associated with the pivot of said arm to said platform for selectively and releasably locking said arm in said generally horizontal position and-/or in said generally vertically downward position, and
resilient suspension means extending between said arm and the underside of said platform, said suspension means being effective when said arm is in said generally horizontal position.

8. A vehicle in accordance with claim 7 wherein said lock means includes lost motion means allowing movement of said arm when locked in said generally horizontal position.

9. A vehicle in accordance with claim 8 including a plurality of load attachment devices arranged around the periphery of said platform and on the upper surface of said platform interiorly of the perimeter of said platform.

10. A vehicle having three ground engaging wheels, comprising;
a unitary platform having an under surface portion and means for suspending two of said wheels therefrom on a common axis of rotation,
a control pedestal extending in a generally upward perpendicular direction from an upper surface portion of said platform in a position for manual access by an operator whether the operator is standing or sitting relative to said platform,
means for selectively locating said pedestal in a first position for use by a standing operator, a second position for use by a sitting operator, and a third position wherein said pedestal extends closely adjacent said upper surface portion of said platform, and
arm means pivoted relative to said under surface of said platform, said arm means mounting the third vehicle wheel and defining an axis of rotation for said third wheel that is parallel to said common axis of rotation, said arm having a generally horizontal position wherein said arm extends in a direction generally away from said common axis of rotation, and having a pivoted position whereupon said arm pivots relative said platform to a generally vertical position, as said platform concomitantly pivots about said common axis of rotation, to thereby facilitate three wheel storage of said vehicle with said platform extending generally vertically.

11. A vehicle in accordance with claim 10 wherein said arm extends in a direction generally perpendicular to said common axis of rotation.

12. A vehicle in accordance with claim 10 including lock means operable to releasably lock said arm in said generally horizontal position.

13. A vehicle in accordance with claim 10 including lock means operable to releasably lock said arm in said generally vertical position.

14. A vehicle in accordance with claim 10 including resilient suspension means extending between said arm and the under side of said platform.

15. A vehicle in accordance with claim 10 including,
a plurality of means for removably attaching elements to said platform at spaced locations around the perimeter of said platform, and
an accessory having a means thereon for engagingly cooperating with said attaching means.

16. A vehicle, comprising;
a platform having a front portion and a substantially horizontal passenger/cargo supporting floor extending rearward from said front portion,
motive means including two side-aligned front wheel means and wheel drive means mounted generally at said front portion of said platform,
arm means having one end pivoted relative the underside of said supporting floor, said arm means mounting rear wheel means at the other end thereof, said arm means having a generally horizontal position wherein said arm extends in a direction generally away the front of the vehicle, and having a generally vertical position wherein said arm is pivoted relative said supporting floor so as to extend in a generally vertical direction, and
steering means connected to said front wheel means, said steering means including a manual actuator extending generally vertically upward from said supporting floor, said actuator being foldable to a generally horizontal position adjacent said supporting floor,
the center of gravity of said vehicle, when empty, being located in general proximity to the front of said vehicle, to thereby facilitate parking/storage of the vehicle by manually lifting the rear of said vehicle while said manual actuator is in said folded position, and as all of said wheel means remain in ground engagement, to thereby facilitate wheel means parking/storage of said vehicle with said supporting floor extending generally vertically.

17. A vehicle in accordance with claim 16 including manually releasable lock means to lock said arm means in said generally horizontal position.

18. A vehicle in accordance with claim 16 including manually releasable lock means to lock said arm means in said generally vertical position.

19. A vehicle in accordance with claim 16 including resilient suspension means extending between said arm means and said platform at a position generally adjacent said rear wheel.

20. A vehicle in accordance with claim 16 including a plurality of load attachment devices arranged around the periphery of said platform and on said supporting floor interiorly of the perimeter of said platform.

21. A vehicle in accordance with claim 16 including,
lock means associated with the pivot of said arm to said platform for selectively and releasably locking said arm in said generally horizontal position and-/or in said generally vertical position, and
resilient suspension means extending between said arm and said platform, said suspension means being effective when said arm is in said generally horizontal position.

22. A vehicle in accordance with claim 21 wherein said lock means includes lost motion means constructed and arranged to facilitate limited rotation of said arm when locked in said generally horizontal position, under the control of said suspension means.

23. A vehicle in accordance with claim 21 including a plurality of load attachment devices arranged around the periphery of said platform and on the upper surface of said platform interiorly of the perimeter of said platform.

* * * * *